(12) United States Patent
Yokoyama et al.

(10) Patent No.: US 8,091,338 B2
(45) Date of Patent: Jan. 10, 2012

(54) EXHAUST GAS CLEANING APPARATUS FOR LEAN BURN INTERNAL COMBUSTION ENGINE

(75) Inventors: Masakuni Yokoyama, Tokai (JP); Jun Kawamura, Aichi-ken (JP)

(73) Assignee: DENSO Corporation, Kariya (JP)

( * ) Notice: Subject to any disclaimer, the term of this patent is extended or adjusted under 35 U.S.C. 154(b) by 781 days.

(21) Appl. No.: 12/141,320

(22) Filed: Jun. 18, 2008

(65) Prior Publication Data

US 2008/0314036 A1    Dec. 25, 2008

(30) Foreign Application Priority Data

Jun. 20, 2007    (JP) .................................. 2007-162197

(51) Int. Cl.
*F02M 25/06* (2006.01)
(52) U.S. Cl. ................. 60/278; 60/280; 60/286
(58) Field of Classification Search .................... 60/277, 60/278, 286, 295, 605.2
See application file for complete search history.

(56) References Cited

U.S. PATENT DOCUMENTS

| | | | |
|---|---|---|---|
| 5,483,795 A | 1/1996 | Katoh et al. | |
| 6,164,063 A * | 12/2000 | Mendler | .......................... 60/274 |
| 6,899,090 B2 * | 5/2005 | Arnold | ..................... 123/568.12 |
| 2004/0237506 A1 | 12/2004 | Yamada et al. | |
| 2006/0064968 A1 * | 3/2006 | Sunohara et al. | ................ 60/285 |
| 2006/0179823 A1 * | 8/2006 | Hinz et al. | ....................... 60/288 |

FOREIGN PATENT DOCUMENTS

| | | | |
|---|---|---|---|
| JP | 2003-065095 | | 3/2003 |
| JP | 2003065095 A | * | 3/2003 |
| JP | 2006-291739 | | 10/2006 |
| JP | 2006291739 A | * | 10/2006 |
| WO | 94/17291 | | 8/1994 |

OTHER PUBLICATIONS

Japanese Office Action dated Jan. 13, 2011, issued in corresponding Japanese Application No. 2007-162197 with English translation.

* cited by examiner

*Primary Examiner* — Thomas Denion
*Assistant Examiner* — Patrick Maines
(74) *Attorney, Agent, or Firm* — Nixon & Vanderhye P.C.

(57) ABSTRACT

An exhaust gas cleaning apparatus includes a LNT, a fuel adding device, an exhaust gas returning passage, and a controller. The LNT is provided in an exhaust gas passage of an engine. The fuel adding device is located upstream of the LNT to add fuel to exhaust gas flowing through the exhaust pipe. The exhaust gas returning passage branches off from the exhaust gas passage at a position downstream of the fuel adding device. The controller controls the apparatus to selectively operate in one of first and second modes according to the operating condition of the engine. In the first mode, the fuel adding device adds the fuel to the exhaust gas with the exhaust gas returning passage closed; in the second mode, the exhaust gas is partially returned to an intake air passage through the exhaust gas returning passage without the fuel being added by the fuel adding device.

6 Claims, 7 Drawing Sheets

DETERIORATION DEGREE OF NOx CATALYST

EXHAUST GAS CLEANING APPARATUS FOR LEAN BURN INTERNAL COMBUSTION ENGINE

CROSS-REFERENCE TO RELATED APPLICATION

This application is based on and claims priority from Japanese Patent Application No. 2007-162197, filed on Jun. 20, 2007, the content of which is hereby incorporated by reference in its entirety into this application.

BACKGROUND OF THE INVENTION

1 Technical Field of the Invention

The present invention relates to an exhaust gas cleaning apparatus for cleaning the exhaust gas from a lean burn internal combustion engine.

2 Description of the Related Art

In a lean burn internal combustion engine, such as a diesel engine or a lean burn gasoline engine, combustion is made at an air/fuel ratio higher than the stoichiometric air/fuel ratio. Due to the excessive air in the air/fuel mixture, it is ineffective to reduce the nitrogen oxides ($NO_x$) contained in the exhaust gas by means of a three-way catalyst. Accordingly, a Lean $NO_x$ Trap (LNT) is used instead to reduce the $NO_x$ contained in exhaust gas. The LNT is configured to absorb the $NO_x$ when the exhaust gas is lean and reduce the absorbed $NO_x$ to harmless nitrogen ($N_2$) and water ($H_2O$) when the exhaust gas turns to rich.

To make the normally lean exhaust gas turn to rich, one approach is to increase the quantities of fuel injected into cylinders of the engine, thereby making the air/fuel mixture in the cylinders rich. However, particularly when the engine is a diesel engine, for making the air/fuel mixture rich, it is necessary to inject a large quantity of fuel into the cylinders of the engine. Accordingly, with the large quantity of fuel, it is difficult to suppress the amount of smoke generated by the combustion of the air/fuel mixture in the cylinders.

Another approach is to directly add fuel to the exhaust gas. More specifically, according to this approach, a fuel injector is mounted on an exhaust pipe of the engine to inject fuel into the exhaust pipe; the injected fuel is then added to the exhaust gas flowing through the exhaust pipe, making it rich; the richened exhaust gas further flows to the LNT located downstream of the fuel injector.

As a related prior art, Japanese Patent No. 2692380, an English equivalent of which is U.S. Pat. No. 5,483,795 discloses an exhaust purification device which can detect when the $NO_x$ absorbed in a $NO_x$ absorber is completely released from the $NO_x$ absorber. The device can also detect the deterioration degree of the $NO_x$ absorber based on the time required for the $NO_x$ absorbed in the $NO_x$ absorber to be completely released from the $NO_x$ absorber.

To more effectively reduce the $NO_x$ contained in the exhaust gas, Exhaust Gas Recirculation (EGR) can be used in combination with the LNT. EGR is a $NO_x$ reduction technique which works by recirculating a portion of the exhaust gas back to the cylinders of the engine.

In particular, when the engine is equipped with a turbocharger, two EGR systems can be arranged around the engine. The first EGR system is a high-pressure EGR which returns the exhaust gas from an exhaust pipe located between an exhaust port and an exhaust gas turbine to an intake pipe of the engine; the second one is a low-pressure EGR which returns the exhaust gas from an exhaust pipe located downstream of the exhaust gas turbine to the intake pipe.

With the two EGR systems, it is possible to recirculate a sufficient quantity of the exhaust gas at a high load. More specifically, at a high-load, it is necessary to feed an increased quantity of the exhaust gas to the exhaust gas turbine to increase the intake air pressure of the engine; accordingly, only a decreased quantity of the exhaust gas can be returned to the intake pipe by the high-pressure EGR. However, since the exhaust gas fed to the exhaust gas turbine can also be returned to the intake pipe by the low-pressure EGR, a sufficient total quantity of the exhaust gas can be returned to the intake pipe at the high-load.

By returning the exhaust gas through the low-pressure EGR, the combustion temperature in the cylinders of the engine can be lowered, thereby decreasing the amount of $NO_x$ contained in the exhaust gas. Moreover, the $NO_x$ reduction performance of a LNT generally drops with increase in the engine load. Therefore, to reliably reduce the $NO_x$ contained in the exhaust gas at a high load, it is preferable to use the LNT in combination with the low-pressure EGR.

However, up to now, no technique or approach has been developed to suitably control a lean burn internal combustion engine where a LNT and a low-pressure EGR are used in combination and where both the EGR and a fuel injector, which injects fuel into the exhaust pipe for enabling the LNT to reduce the $NO_x$, also need to be suitably controlled. Moreover, there are several problems to be considered in controlling both the low-pressure EGR and the fuel injector.

For example, when the fuel injector injects fuel into the exhaust pipe for enabling the LNT to reduce the $NO_x$ while the low-pressure EGR is in operation, a portion of the injected fuel will be returned to the intake pipe by the low-pressure EGR. As a result, sulfur components in the returned fuel can corrode, for example, an intercooler arranged in the intake pipe.

Moreover, the $NO_x$ reduction performance of the LNT rapidly drops when a $NO_x$ catalyst of the LNT is deteriorated due to sulfur-poison and heat.

Figure 11:
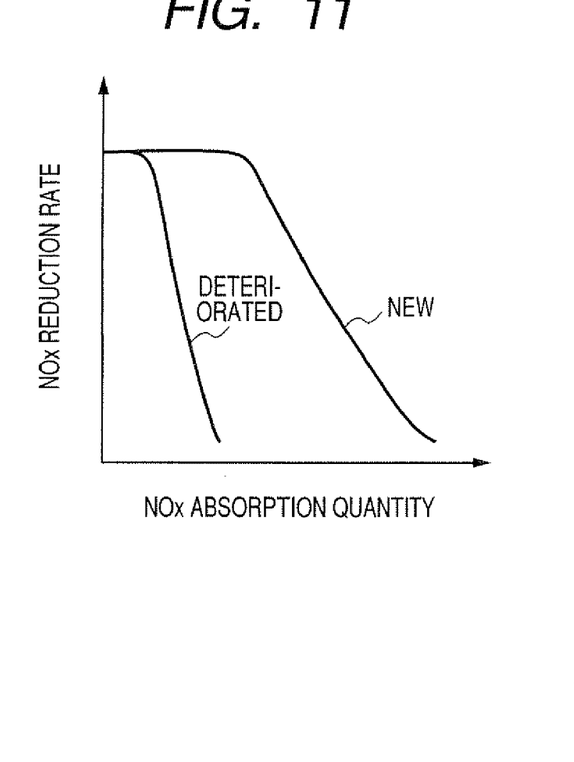
FIG. 11 is a graphical representation showing the relationship between the $NO_x$ absorption quantity and the $NO_x$ reduction rate of a LNT in each of the cases of a $NO_x$ catalyst of the LNT being new and being completely deteriorated.

FIG. 11 shows the relationship between the $NO_x$ absorption quantity and the $NO_x$ reduction rate of the LNT in each of two cases. In the first case, the $NO_x$ catalyst is new; in the second case, the $NO_x$ catalyst is completely deteriorated. As shown in FIG. 11, in the second case, the $NO_x$ reduction rate of the LNT begins to rapidly drop at a much smaller $NO_x$ absorption quantity than in the first case.

Furthermore, in the second case, the $NO_x$ absorption capacity of the LNT is also lowered and thus a smaller portion of the fuel injected by the fuel injector into the exhaust pipe can be used by the LNT for $NO_x$ reduction than in the first case.

Figure 12:
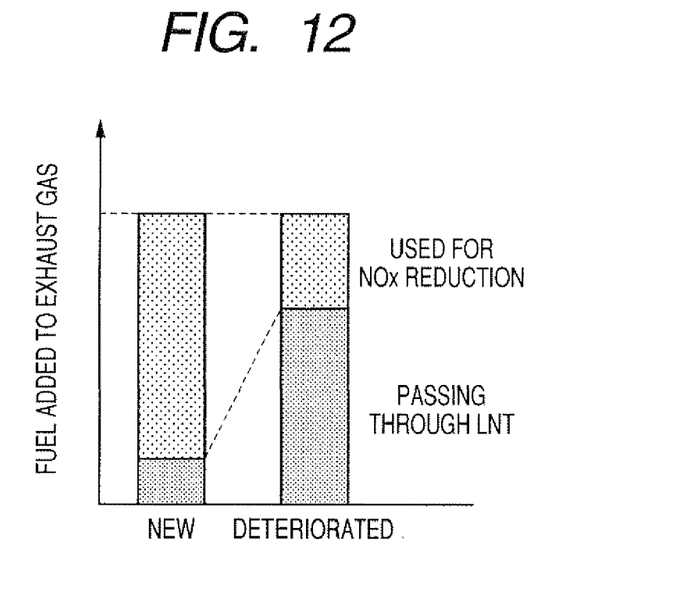
FIG. 12 is a graphical representation showing the ratio between the portion of fuel added to the exhaust gas which is used by the LNT for $NO_x$ reduction and the remaining portion that passes through the LNT in each of the cases of the $NO_x$ catalyst being new and being completely deteriorated.

FIG. 12 shows the ratio between that portion of the fuel which is used by the LNT for $NO_x$ reduction and the remaining portion that passes through the LNT in each of the first and second cases. As shown in FIG. 12, in the second case (i.e., when the $NO_x$ catalyst is completely deteriorated), the majority of the fuel injected by the fuel injector into the exhaust pipe passes through the LNT without being used by the LNT for $NO_x$ reduction, resulting in an increased concentration of HC in the exhaust gas.

SUMMARY OF THE INVENTION

The present invention has been made in view of the above-mentioned problems.

According to the present invention, there is provided an exhaust gas cleaning apparatus for the cleaning exhaust gas from an internal combustion engine. The exhaust gas cleaning apparatus includes a Lean $NO_x$ Trap (LNT), a fuel adding device, an exhaust gas returning passage, and a controller.

The LNT is provided in an exhaust gas passage of the engine through which the exhaust gas flows. The LNT is configured to absorb $NO_x$ contained in the exhaust gas when the exhaust gas is lean and reduce the absorbed $NO_x$ when the exhaust gas turns to rich. The fuel adding device is located upstream of the LNT to add fuel to the exhaust gas for making the exhaust gas rich. The exhaust gas returning passage branches off from the exhaust gas passage at a position downstream of the fuel adding device to return part of the exhaust gas to an intake air passage of the engine. The controller determines an operating condition of the engine and controls the exhaust gas cleaning apparatus to selectively operate in one of first and second operation modes according to the determined operating condition of the engine. In the first operation mode, the fuel adding device adds the fuel to the exhaust gas with the exhaust gas returning passage closed; in the second operation mode, the part of the exhaust gas is returned to the intake air passage through the exhaust gas returning passage without the fuel being added by the fuel adding device to the exhaust gas.

With the above configuration, it is possible for the exhaust gas cleaning apparatus to effectively reduce the $NO_x$ contained in the exhaust gas by means of either the LNT or the exhaust gas returning passage according to the operating condition of the engine. Moreover, since the exhaust gas returning passage is closed when the fuel adding device adds the fuel to the exhaust gas, no fuel is returned to the intake air passage through the exhaust gas returning passage. Consequently, components arranged in the intake air passage, such as an intercooler, will never be corroded by the fuel.

According to a further implementation of the invention, the controller determines whether the engine operates in a first operation region, in which both the rotational speed and load of the engine is low, or in a second operation region in which either or both of the rotational speed and load of the engine are high. The controller controls the exhaust gas cleaning apparatus to operate in the first operation mode when the engine operates in the first operation region and in the second operation mode when the engine operates in the second operation region.

With the above configuration, it is possible for the exhaust gas cleaning apparatus to reliably reduce the $NO_x$ contained in the exhaust gas in the entire operation region of the engine. More specifically, the $NO_x$ reduction performance of the LNT generally drops with increase in the temperature of the engine; the temperature of the engine increases both with the rotational speed of the engine and with the load of the engine. When the engine operates in the first operation region, in which both the rotational speed and load of the engine is low, the $NO_x$ reduction performance of the LNT is high and it is thus possible to reliably reduce the $NO_x$ contained in the exhaust gas only by means of the LNT. On the other hand, when the engine operates in the second operation region, in which either or both of the rotational speed and load of the engine are high, the $NO_x$ reduction performance of the LNT drops but the $NO_x$ contained in the exhaust gas can be reliably reduced by means of the exhaust gas returning passage.

The exhaust gas cleaning apparatus further includes detecting means for detecting the deterioration degree of a $NO_x$ catalyst of the LNT. As the deterioration degree of the $NO_x$ catalyst detected by the detecting means increases, the controller reduces the first operation region of the engine while accordingly expanding the second operation region of the engine.

With the above configuration, it is possible for the exhaust gas cleaning apparatus to reliably reduce the $NO_x$ contained in the exhaust gas regardless of the deterioration degree of the $NO_x$ catalyst. More specifically, as the deterioration degree of the $NO_x$ catalyst increases, the first operation region of the engine is reduced and the second operation region of the engine is accordingly expanded, so that the exhaust gas cleaning apparatus comes to reduce the $NO_x$ depending more on the exhaust gas returning passage and less on the LNT. As a result, the $NO_x$ reduction performance of the entire exhaust gas cleaning apparatus can be kept high.

Further, the controller selects a first boundary to separate the first and second operation regions of the engine when the deterioration degree of the $NO_x$ catalyst detected by the detecting means is lower than or equal to a predetermined threshold, and a second boundary to separate the first and second operation regions when the deterioration degree of the $NO_x$ catalyst is higher than the predetermined threshold.

With the above configuration, it is possible for the controller to easily and suitably delimit the first and second operation regions of the engine according to the deterioration degree of the $NO_x$ catalyst.

Moreover, the controller sets an expanding rate of the second operation region of the engine as a function of the deterioration degree of the $NO_x$ catalyst detected by the detecting means. The function is such that the expanding rate of the second operation region set with this function increases faster than that set with a liner function.

With the above configuration, it is possible for the controller to more suitably delimit the first and second operation regions according to the deterioration degree of the $NO_x$ catalyst, thereby more reliably ensuring a high $NO_x$ reduction performance of the entire exhaust gas cleaning apparatus.

Preferably, the internal combustion engine is a diesel engine. This is because $NO_x$ reduction is essential for a diesel engine.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Preferred embodiments of the present invention will be described hereinafter with reference to FIGS. 1-10.

It should be noted that, for the sake of clarity and understanding, identical components having identical functions in different embodiments of the invention have been marked, where possible, with the same reference numerals in each of the figures.

First Embodiment

Figure 1:
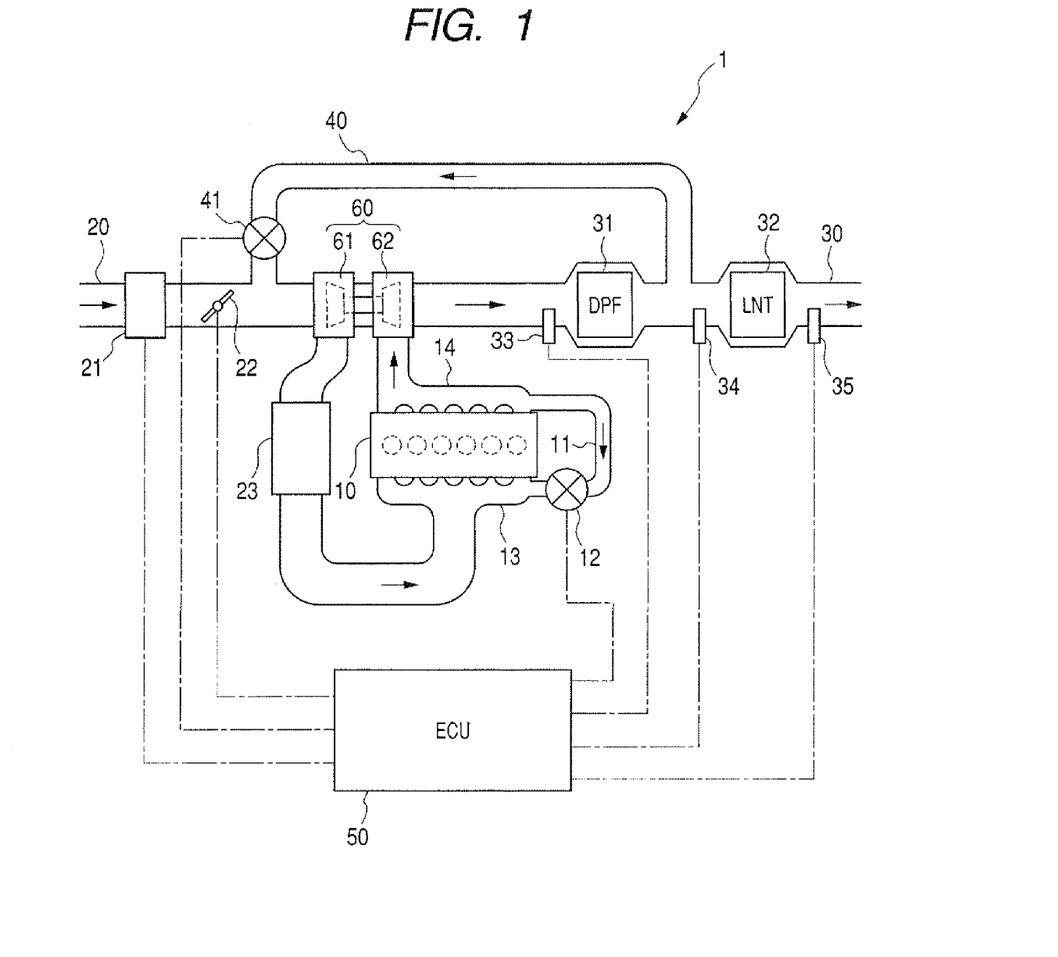
FIG. 1 is a schematic view showing the overall configuration of an exhaust gas cleaning apparatus for a diesel engine according to the first embodiment of the invention.

FIG. 1 shows the overall configuration of an exhaust gas cleaning apparatus 1 according to the first embodiment of the invention.

The exhaust gas cleaning apparatus 1 is designed to reduce the nitrogen oxides ($NO_x$) contained in the exhaust gas from a diesel engine 10. Around the diesel engine 10, there are also provided an intake pipe 20, an exhaust pipe 30, a low-pressure EGR passage 40, and an Electronic Control Unit (ECU) 50 that controls operations of the diesel engine 10 and the exhaust gas cleaning apparatus 1.

The diesel engine 10 is supplied with fresh air from an intake manifold 13, and exhausts to an exhaust manifold 14. The fresh air is supplied to the intake manifold 13 from the intake pipe 20, and the exhaust gas from the diesel engine 10 is further discharged from the exhaust manifold 14 to the exhaust pipe 30. The diesel engine 10 is also supplied with fuel by fuel injectors (not shown) which inject the fuel into corresponding cylinders of the diesel engine 10. The ECU 50 determines, according to the operating condition of the diesel engine 10, fuel injection timings and fuel injection quantities for the fuel injectors to inject the fuel into the corresponding cylinders. It should be noted that for the sake of simplicity, components relating to the fuel supply to the diesel engine 10 are omitted from FIG. 1.

In the intake pipe 20, there are arranged an air flow meter 21, an intake throttle valve 22, and an intercooler 23. The air flow meter 21 measures the flow rate of the intake air (i.e., the fresh air) and outputs to the ECU 50 a signal indicative of the measured flow rate. The intake throttle valve 22 is located downstream of the air flow meter 21 and serves to adjust the flow rate of the intake air. The intercooler 23 works to cool the intake air before it enters the cylinders of the diesel engine 20.

In the exhaust pipe 30, there are arranged a Diesel Particulate Filter (DPF) 31 and a Lean $NO_x$ Trap (LNT) 32. The DPF 31 traps diesel particulate matter or soot contained in the exhaust gas. The LNT 32 absorbs the $NO_x$ contained in the exhaust gas when the exhaust gas is lean (generally, the air/fuel ratio is 17 or higher) and reduces the absorbed $NO_x$ to harmless nitrogen ($N_2$) and water ($H_2O$) when the exhaust gas turns to rich (generally, the air/fuel ratio is 14.5 or lower).

Further, a fuel injector 33 is mounted on the exhaust pipe 30 upstream of the DPF 31. The fuel injector 33 injects fuel into the exhaust pipe 30 to make the exhaust gas flowing through the exhaust pipe 30 rich. Fuel injection timings and fuel injection quantities for the fuel injector 33 to inject the fuel are controlled by the ECU 50. Moreover, on the exhaust pipe 30, there are also mounted A/F sensors (i.e., air/fuel ratio sensors) 34 and 35 respectively on the upstream and downstream sides of the LNT 32. Each of the A/F sensors 34 and 35 senses the air/fuel ratio of the exhaust gas and outputs to the ECU 50 a signal representative of the sensed air/fuel ratio.

In the present embodiment, the diesel engine 10 is equipped with a turbocharger 60 that includes a compressor 61 and an exhaust gas turbine 62. Moreover, the diesel engine 10 is provided with two EGR (Exhaust Gas Recirculation) systems. The first EGR system is configured with a low-pressure EGR passage 40 and an EGR valve 41. The low-pressure EGR passage 40 branches off from the exhaust pipe 30 at a position between the DPF 31 and the LNT 32, so as to return part the exhaust gas to the intake pipe 20. Accordingly, the low-pressure EGR passage 40 communicates with the exhaust pipe 30 on the downstream side of the fuel injector 33. The EGR valve 41 adjusts, under control of the ECU 50, the flow rate of the exhaust gas returned through the low-pressure EGR passage 40. On the other hand, the second EGR system is configured with a high-pressure EGR passage 11 and an EGR valve 12. The high-pressure EGR passage 11 fluidically connects the exhaust manifold 14 and the intake manifold 13, so as to return part of the exhaust gas to the intake manifold 13. The EGR valve 12 adjusts, under control of the ECU 50, the flow rate of the exhaust gas returned through the high-pressure EGR passage 11. As previously described in the "Description of the Related Art" section, the exhaust gas is returned through the low-pressure EGR passage 40 when it is impossible to return a sufficient quantity of exhaust gas only through the high-pressure EGR passage 11 in a high-load condition of the diesel engine 10.

In the present embodiment, the DPF 31, the LNT 32, the fuel injector 33, the low-pressure EGR passage 40, the EOR valve 41, and the ECU 50 together make up the exhaust gas cleaning apparatus 1.

Moreover, in the present embodiment, the exhaust gas cleaning apparatus 1 operates in either of first and second operation modes. In the first mode, the fuel injector 33 injects the fuel into the exhaust pipe 30 with the low-pressure EOR passage 40 closed; in the second mode, the part of the exhaust gas is returned through the low-pressure EGR passages 40 without the fuel being injected by the fuel injector 33 into the exhaust pipe 30. The ECU 50 controls the exhaust gas cleaning apparatus 1 to selectively operate in one of the first and second modes according to the operating condition of the diesel engine 10. More specifically, the entire operation region of the diesel engine 10 is divided by a boundary into first and second operation regions. The ECU 50 controls the exhaust gas cleaning apparatus 1 to operate in the first mode when the diesel engine 10 operates in the first region and in the second mode when the same operates in the second region. Moreover, the ECU 50 changes, according to the deterioration degree of a $NO_x$ catalyst of the LNT 32, the boundary line that separates the first and second operation regions of the diesel engine 10.

Figure 2:
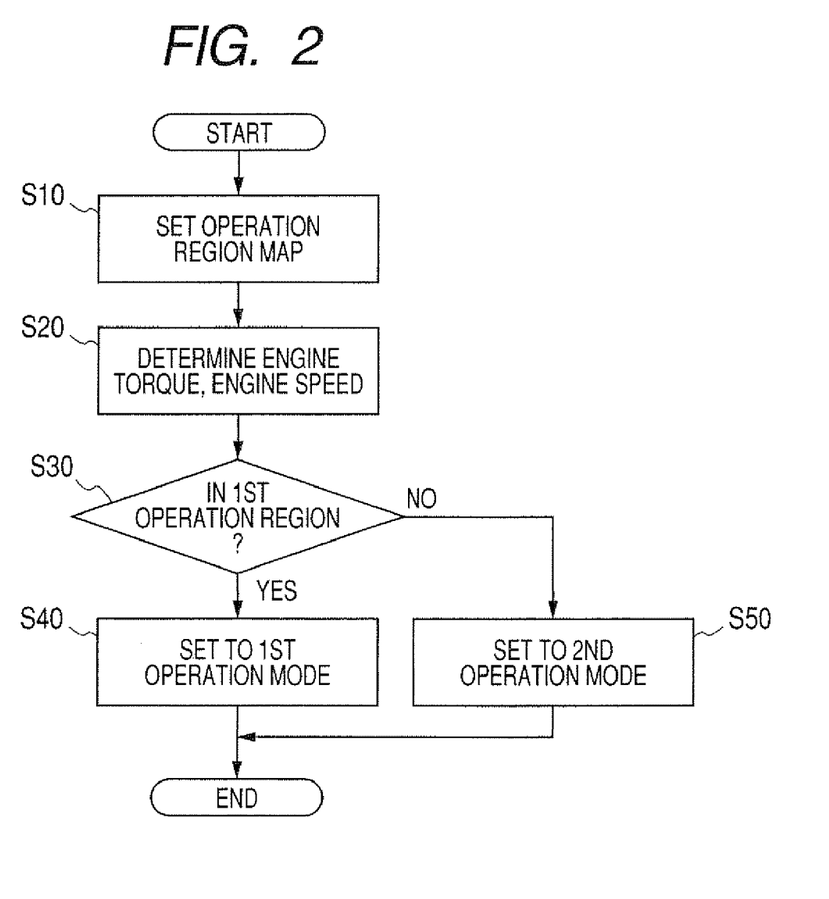
FIG. 2 is a flow chart illustrating an operation mode setting process of an Electronic Control Unit (ECU) of the exhaust gas cleaning apparatus.

FIG. 2 shows an operation mode setting process of the ECU 50 for the exhaust gas cleaning apparatus 1. This process is repeated by the ECU 50 at predetermined time intervals.

First, in step S10, the ECU 50 sets an operation region map of the diesel engine 10.

Figure 5:
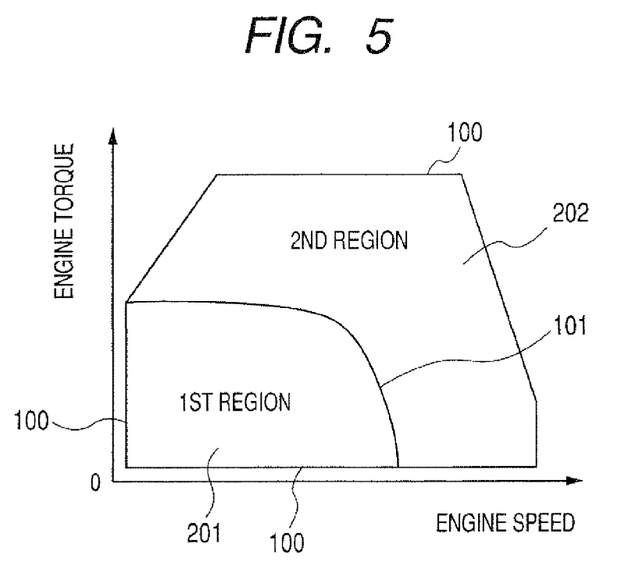
FIG. 5 is a schematic view illustrating an operation region map of the diesel engine for use when a $NO_x$ catalyst of a LNT of the exhaust gas cleaning apparatus is new.

In the present embodiment, as shown in FIG. 5, the operation region map is a two dimensional map, with the horizontal axis representing the rotational speed of the diesel engine 10 and the vertical axis representing the torque of the diesel engine 10 (or the fuel injection quantity injected into the cylinders of the diesel engine 10).

Moreover, in FIG. 5, a solid line 100 represents the outline of the entire operation region of the diesel engine 10; the outline is specific to the diesel engine 10. A solid line 101 represents the boundary, by which the entire operation region of the diesel engine 10 enclosed by the solid line 100 is divided into the first operation region 201 and the second operation region 202. The first operation region 201 is positioned closer to the origin of the operation region map than the second operation region 202. In addition, the boundary line 101 itself may be predetermined to belong to either the first operation region 201 or the second operation region 202.

Generally, the temperature of the diesel engine 10 increases both with the rotational speed of the diesel engine 10 and with the load of the diesel engine 10; the load can be represented by either the torque of the diesel engine 10 or the fuel injection quantity injected into the cylinders of the diesel engine 10. Further, the $NO_x$ reduction performance of the LNT 32 generally drops with increase in the temperature of the diesel engine 10. Accordingly, when the to diesel engine 10 operates in the second operation region 202, in which either or both of the rotational speed and load of the diesel engine 10 are high, the exhaust gas cleaning apparatus 1 operates in the second mode to reduce the $NO_x$ contained in the exhaust gas only by means of the low-pressure EGR system. On the contrary, when the diesel engine 10 operates in the first operation region 201, in which both the rotational speed and load of the diesel engine 10 are low, the exhaust gas cleaning apparatus 1 operates in the first mode to reduce the $NO_x$ only by means of the LNT 32.

Returning to FIG. 2, in step S20, the ECU 50 determines both the torque and rotational speed of the diesel engine 10. For example, the ECU 50 may determine the torque of the diesel engine 10 based on a signal which is output from an accelerator position sensor (not shown) that senses the position of an accelerator of the vehicle powered by the diesel engine 10. The ECU 50 may also determine the rotational speed of the diesel engine 10 based on a signal which is output from a rotational speed sensor (not shown) that senses the rotational speed of the diesel engine 10. In addition, when the vertical axis of the operation region map is represented by the fuel injection quantity, the ECU 50 determines the fuel injection quantity instead of the torque of the diesel engine 10.

In step S30, the ECU 50 determines, based on the torque and rotational speed of the diesel engine 10 determined in step S20, whether the diesel engine 10 operates in the first region 201 shown in FIG. 5.

If the determination in step S30 produces a "YES" answer, then the process proceeds to step S40.

In step S40, the ECU 50 sets the operation mode of the exhaust gas cleaning apparatus 1 to the first mode; then, the process goes to end. As described above, in the first mode, the fuel injector 33 injects, under control of the ECU 50, the fuel into the exhaust pipe 30 with the low-pressure EGR passage 40 closed (i.e., with the EGR valve 41 closed).

On the other hand, if the determination in step S30 produces a "NO">answer, then the process goes on to step S50.

In step S50, the ECU 50 sets the operation mode of the exhaust gas cleaning apparatus 1 to the second mode; then, the process goes to end. As described above, in the second mode, the exhaust gas is partially returned from the exhaust pipe 30 to the intake pipe 20 through the low-pressure EGR passage 40 while no fuel is injected by the fuel injector 33 into the exhaust pipe 30. The ECU 50 controls the flow rate of the fuel returned through the low-pressure EGR passage 40 by controlling the opening degree of the EGR valve 41.

Figure 3:
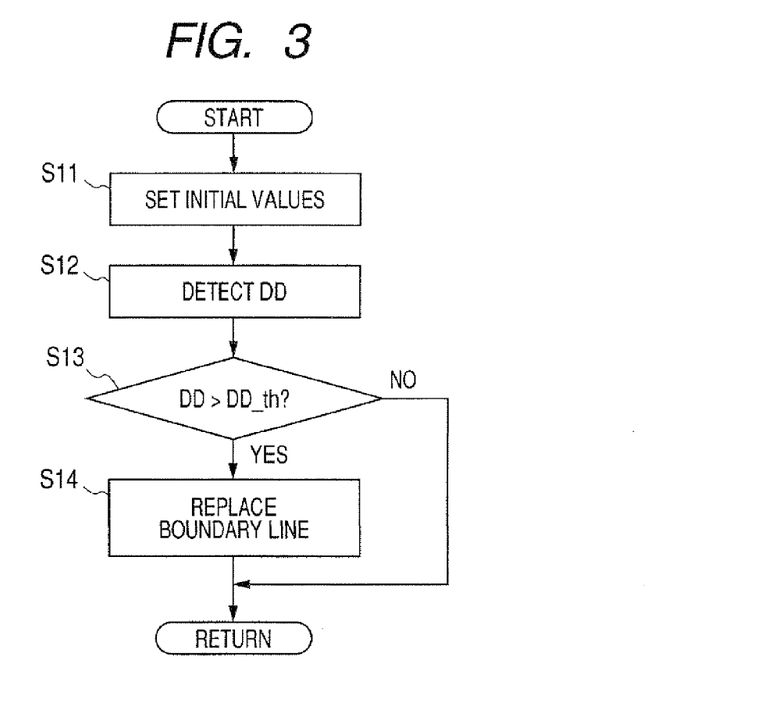
FIG. 3 is a flow chart illustrating an operation region map setting process of the ECU.

FIG. 3 shows in detail a process of the ECU 50 for setting the operation region map of the diesel engine 10. This process is a subprocess of the above-described operation mode setting process and corresponds to step S10 of FIG. 2.

First, in step S11, the ECU 50 sets initial values of the operation region map, resulting in the map as, for example, shown in FIG. 5.

It should be noted that in the operation region map shown in FIG. 5, the boundary for separating the first and second operation regions 201 and 202 of the diesel engine 10 is initially set to the solid line 101. In addition, step S11 may be performed only once in the first execution of the process after start of the diesel engine 10. In other words, step S11 may be omitted in the second and subsequent executions of the process.

In step S12, the ECU 50 detects the deterioration degree DD of the $NO_x$ catalyst of the LNT 32.

The deterioration degree DD can be detected by using existing methods, such as the one disclosed in Japanese Patent No. 2692380. For example, the ECU 50 may be configured to: 1) evaluate the current $NO_x$ reduction performance of the LNT 32 based on the signals output from the A/F sensors 34 and 35; 2) compare the estimated current $NO_x$ reduction performance with the original $NO_x$ reduction performance of the LNT 32 (i.e., the $NO_x$ reduction performance when the $NO_x$ catalyst is new); and 3) determine the deterioration degree DD based on the comparison between the current and original $NO_x$ reduction performances of the LNT 32.

In step S13, the ECU 50 makes a determination as to whether the deterioration degree DD detected in step S12 is higher than a predetermined threshold DD_th.

If the determination in step S13 produces a "NO" answer, then the process directly returns to the main process shown in FIG. 2, maintaining the initial boundary line 101.

On the contrary, if the determination in step S13 produces a "YES" answer, then the process proceeds to step S14.

In step S14, the ECU 50 replaces the initial boundary line 101 with a new boundary line 102. Then, the process returns to the main process shown in FIG. 2.

Figure 4:
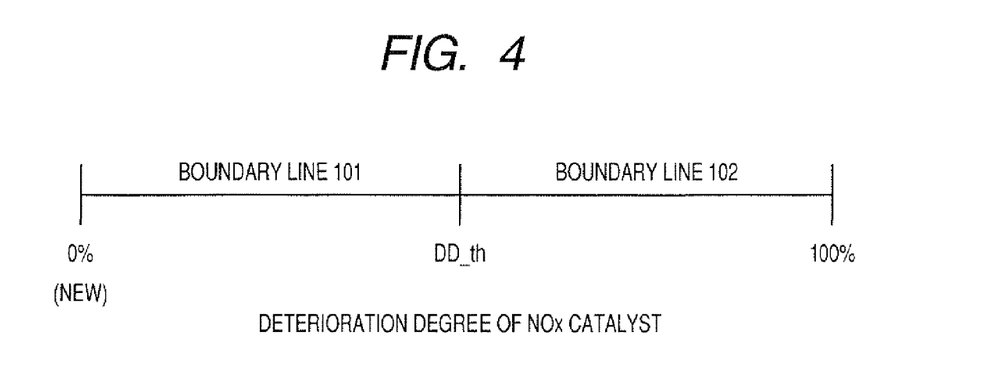
FIG. 4 is a schematic view illustrating a boundary line replacement in the process of FIG. 3.

FIG. 4 illustrates the boundary line replacement in step S14. More specifically, in FIG. 4, "0%" indicates that the $NO_x$ catalyst of the LNT 32 is new, while "100%" indicates that the $NO_x$ catalyst is completely deteriorated. The entire range of the deterioration degree DD of the $NO_x$ catalyst is divided by the predetermined threshold DD_th into two sub-ranges. When the deterioration degree DD of the $NO_x$ catalyst falls in the sub-range between the predetermined threshold DD_th and 100%, the initial boundary line 101 is replaced with the new boundary line 102. Otherwise, when the deterioration degree DD falls in the sub-range between 0% and DD_th, the initial boundary line 101 is maintained.

Figure 6:
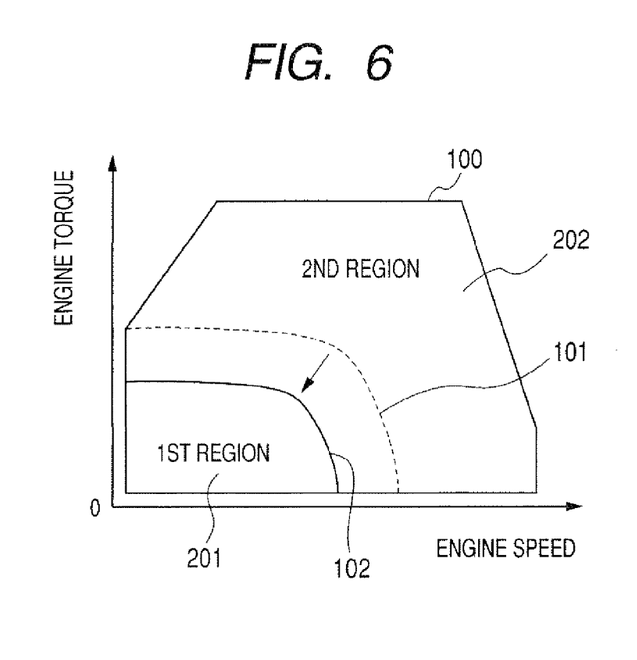
FIG. 6 is a schematic view illustrating an operation region map of the diesel engine for use when the $NO_x$ catalyst is deteriorated.

Referring further to FIG. 6, the new boundary line 102 is positioned on the operation region map closer to the origin of the map than the initial boundary line 101. In other words, the boundary line between the first and second operation regions 201 and 202 is shifted toward the origin of the map with increase in the deterioration degree DD of the $NO_x$ catalyst. Consequently, through the boundary line replacement, the first operation region 201 is reduced while the second operation region 202 is accordingly expanded.

As described previously, the $NO_x$ reduction performance of the LNT 32 drops as the deterioration degree DD of the $NO_x$ catalyst increases. Therefore, when the deterioration degree DD exceeds the predetermined threshold DD_th, the ECU 50 reduces the first operation region 201 while accordingly expanding the second operation region 202. Consequently, the exhaust gas cleaning apparatus 1 comes to operate more in the second mode and less in the first mode than before the boundary line replacement. That is, the exhaust gas cleaning apparatus 1 comes to reduce the $NO_x$ contained in the exhaust gas depending more on the low-pressure EGR system and less on the LNT 32 than before the boundary lien replacement.

In addition, when the $NO_x$ catalyst of the LNT 32 hardly deteriorates or deteriorates very slowly, steps S12, S13, S14 may be omitted from the operation region map setting process shown in FIG. 3.

Second Embodiment

This embodiment illustrates an operation region map setting process of the ECU 50 which is different from the operation region map setting process according to the first embodiment.

As described above, in the first embodiment, there is predetermined only the single threshold DD_th by which the entire range of the deterioration degree DD of the $NO_x$ catalyst is divided into two sub-ranges; the two sub-ranges respectively correspond to the two boundary lines 101 and 102. The ECU 50 selects one of the two boundary lines 101 and 102 according to the sub-range in which the current deterioration degree DD of the $NO_x$ catalyst falls.

In comparison, in the present embodiment, there are predetermined N (N is an integer greater than 1) thresholds by which the entire range of the deterioration degree DD of the $NO_x$ catalyst is divided into (N+1) sub-ranges; to each of the (N+1) sub-ranges, there is assigned a boundary line. Accordingly, the number of the boundary lines is (N+1).

Figure 7:
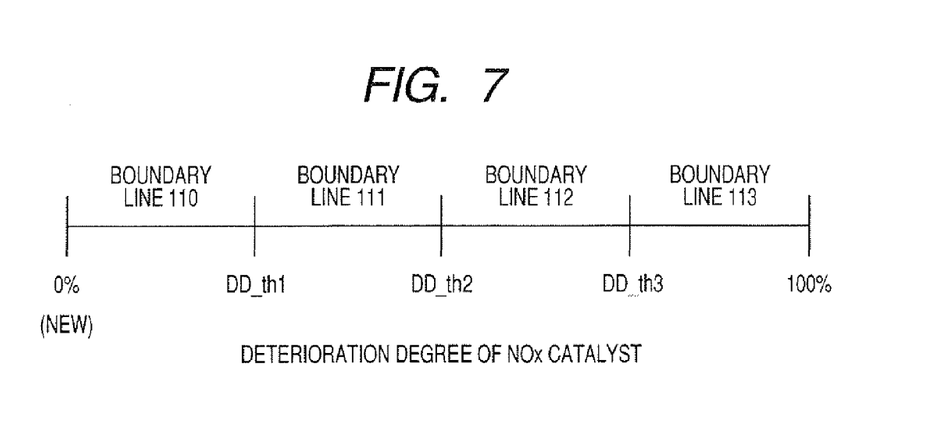
FIG. 7 is a schematic view illustrating a boundary line selection according to the second embodiment of the invention.

FIG. 7 illustrates a case where N is equal to 3. More specifically, in FIG. 7, there are predetermined three thresholds DD_th1, DD_th2, and DD_th3 by which the entire range of the deterioration degree DD of the $NO_x$ catalyst is divided into four sub-ranges. There are also provided four boundary lines 110, 111, 112, and 113 that respectively correspond to the four sub-ranges.

Figure 8:
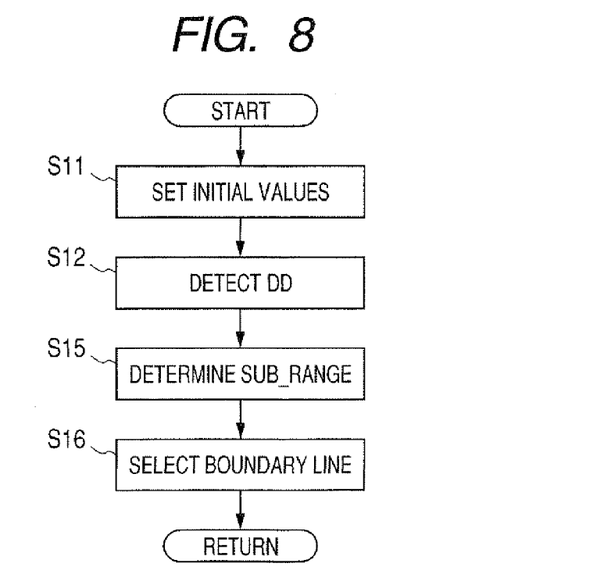
FIG. 8 is a flow chart illustrating an operation region map setting process of the ECU according to the second embodiment.

FIG. 8 shows the operation region map setting process of the ECU 50 according to the present embodiment.

First, in step S11, the ECU 5 sets initial values of the operation region map.

In step S12, the ECU 50 detects the deterioration degree DD of the $NO_x$ catalyst of the LNT 32.

In step S15, the ECU 50 determines in which of the four sub-ranges shown in FIG. 7 the detected deterioration degree DD falls.

In step S16, the ECU 50 selects that one of the four boundary lines 110, 111, 112, and 113 which corresponds to the sub-range in which the detected deterioration degree DD falls. Then, the ECU 50 divides the entire operation region of the diesel engine 10 into the first and second operation regions 201 and 202 by the selected boundary line. After that, the process returns to the main process shown in FIG. 2.

Figure 9:
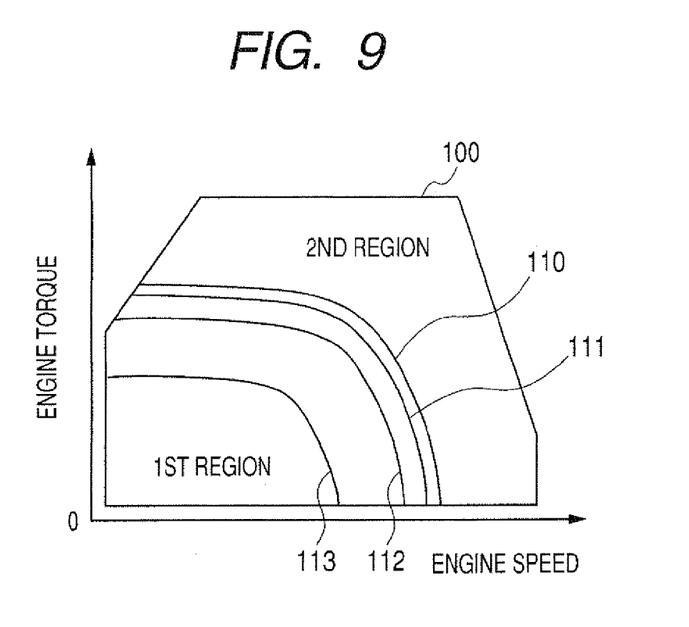
FIG. 9 is a schematic view illustrating the relationship between the deterioration degree of the $NO_x$ catalyst and the boundary line selection in the process of FIG. 8.

Referring further to FIG. 9, the deterioration degrees of the $NO_x$ catalyst corresponding to the four boundary lines 110, 111, 112, and 113 are in inverse proportion to the distances from the origin of the map to the four boundary lines. Therefore, the higher the deterioration degree DD detected in step S12 is, the closer one of the four boundary lines to the origin of the map is selected in step S16. In other words, the boundary line between the first and second operation regions 201 and 202 is shifted toward the origin of the map with increase in the deterioration degree DD of the $NO_x$ catalyst. Consequently, the first operation region 201 is reduced while the second operation region 202 is accordingly expanded.

Figure 10:
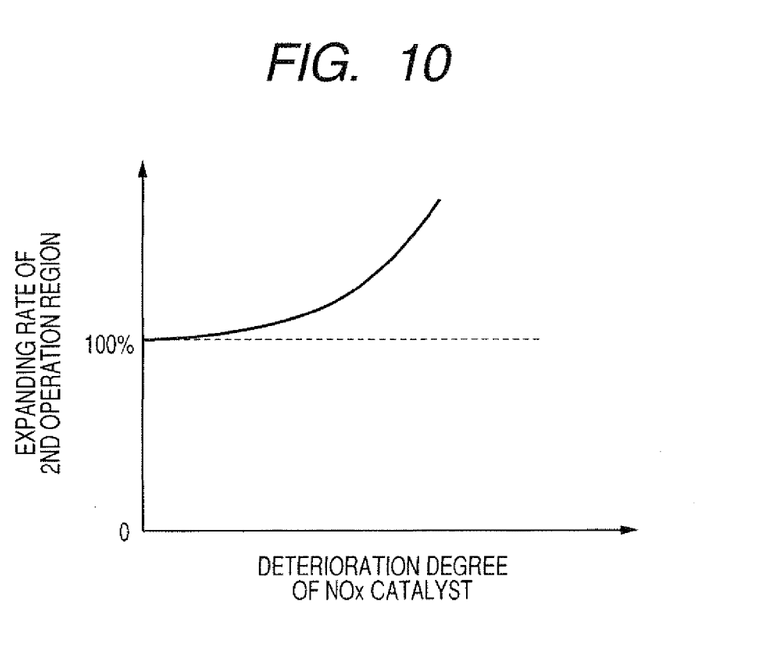
FIG. 10 is a graphical representation illustrating an exemplary function between the deterioration degree of the $NO_x$ catalyst and the expanding rate of a second operation region of the engine.

Moreover, the ECU 50 may set the expanding rate of the second operation region 202 as a liner function of the deterioration degree DD of the $NO_x$ catalyst. However, as previously described in the "Description of the Related Art" section, the $NO_x$ reduction performance of the LNT 32 rapidly drops with increase in the deterioration degree DD of the $NO_x$ catalyst. Therefore, it is preferable for the ECU 50 to use a function, such as a quadratic function or an exponential function, with which the expanding rate of the second operation region 202 is set to increase faster than with the liner function. FIG. 10 shows an example of such a function between the deterioration degree DD of the $NO_x$ catalyst and the expanding rate of the second operation region 202.

The boundary lines 110, 111, 112, and 113 shown in FIG. 9 are predetermined using the function shown in FIG. 10, with the thresholds DD_th1, D_th2, and DD_th3 equally spaced in FIG. 9. Consequently, the intervals between the boundary lines 110-113 increase as the boundary lines get closer to the origin of the operation region map. With such boundary lines 110-113, it is possible for the exhaust gas cleaning apparatus 1 to reliably reduce the $NO_x$ contained in the exhaust gas even when the $NO_x$ catalyst of the LNT 32 is deteriorated.

Comparing the two operation region map setting processes according to the first and second embodiments, the process according to the first embodiment is simpler but still possible to cope with the deterioration of the $NO_x$ catalyst of the LNT 32; the process according to the second embodiment is more complicated but possible to more effectively cope with the deterioration of the $NO_x$ catalyst.

While the above particular embodiments of the present invention have been shown and described, it will be understood by those skilled in the art that various modifications, changes, and improvements may be made without departing from the spirit of the invention.

For example, in the second embodiment, the boundary lines 110, 111, 112, and 113 are so predetermined that the intervals between the boundary lines are different from each other. However, it is also possible to predetermine the boundary lines so that they are equally spaced on the operation region map.

Moreover, in the previous embodiments, the exhaust gas cleaning apparatus 1 is used to clean the exhaust gas from the diesel engine 10. However, the present invention can also be applied to an exhaust gas cleaning apparatus for cleaning the exhaust as from a lean burn gasoline engine.

What is claimed is:

1. An exhaust gas cleaning apparatus for cleaning exhaust gas from an internal combustion engine, the apparatus comprising:
   a Lean $NO_x$ Trap (LNT) provided in an exhaust gas passage of the engine through which the exhaust gas flows, the LNT being configured to absorb $NO_x$ contained in the exhaust gas when the exhaust gas is lean and reduce the absorbed $NO_x$ when the exhaust gas turns to rich;
   a fuel adding device located upstream of the LNT to add fuel to the exhaust gas for making the exhaust gas rich;
   an exhaust gas returning passage that branches off from the exhaust gas passage at a position downstream of a turbocharger of the engine to return part of the exhaust gas to an intake air passage of the engine; and
   a controller configured to determine an operating condition of the engine and control the exhaust gas cleaning apparatus to selectively operate in one of first and second operation modes according to the determined operating condition of the engine, in the first operation mode the fuel adding device adding the fuel to the exhaust gas with the exhaust gas returning passage closed, in the second operation mode the part of the exhaust gas being returned to the intake air passage through the exhaust gas returning passage without the fuel being added by the fuel adding device to the exhaust gas, wherein the controller is configured to determine whether the engine operates in a first operation region, in which both the rotational speed and load of the engine is low, or in a second operation region in which either or both of the rotational speed and load of the engine are high, and the controller is configured to control the exhaust gas cleaning apparatus to operate in the first operation mode when the engine operates in the first operation region and in the second operation mode when the engine operates in the second operation region.

2. The exhaust gas cleaning apparatus as set forth in claim 1, wherein the internal combustion engine is a diesel engine.

3. An exhaust gas cleaning apparatus for cleaning exhaust gas from an internal combustion engine, the apparatus comprising:

a Lean $NO_x$ Trap (LNT) provided in an exhaust gas passage of the engine through which the exhaust gas flows, the LNT being configured to absorb $NO_x$ contained in the exhaust gas when the exhaust gas is lean and reduce the absorbed $NO_x$ when the exhaust gas turns to rich;

a fuel adding device located upstream of the LNT to add fuel to the exhaust gas for making the exhaust gas rich;

an exhaust gas returning passage that branches off from the exhaust gas passage at a position downstream of the fuel adding device to return part of the exhaust gas to an intake air passage of the engine; and a controller is configured to determine an operating condition of the engine and controls the exhaust gas cleaning apparatus to selectively operate in one of first and second operation modes according to the determined operating condition of the engine, in the first operation mode the fuel adding device adding the fuel to the exhaust gas with the exhaust gas returning passage closed, in the second operation mode the part of the exhaust gas being returned to the intake air passage through the exhaust gas returning passage without the fuel being added by the fuel adding device to the exhaust gas, wherein the controller is configured to determine whether the engine operates in a first operation region, in which both the rotational speed and load of the engine is low, or in a second operation region in which either or both of the rotational speed and load of the engine are high, the controller is configured to control the exhaust gas cleaning apparatus to operate in the first operation mode when the engine operates in the first operation region and in the second operation mode when the engine operates in the second operation region, the exhaust gas cleaning apparatus further comprises a detector configured to detect the deterioration degree of a $NO_x$ catalyst of the LNT, and as the deterioration degree of the $NO_x$ catalyst detected by the detector increases, the controller reduces the first operation region of the engine while accordingly expanding the second operation region of the engine.

4. The exhaust gas cleaning apparatus as set forth in claim 3, wherein the controller is configured to select a first boundary to separate the first and second operation regions of the engine when the deterioration degree of the $NO_x$ catalyst detected by the detector is lower than or equal to a predetermined threshold, and a second boundary to separate the first and second operation regions when the deterioration degree of the $NO_x$ catalyst is higher than the predetermined threshold.

5. The exhaust gas cleaning apparatus as set forth in claim 3, wherein the controller is configured to set an expanding rate of the second operation region of the engine as a function of the deterioration degree of the $NO_x$ catalyst detected by the detector, the function being such that the expanding rate of the second operation region set with it increases faster than that set with a liner function.

6. The exhaust gas cleaning apparatus as set forth in claim 3, wherein the internal combustion engine is a diesel engine.

* * * * *